US005850697A

United States Patent [19]

Welch

[11] Patent Number: 5,850,697

[45] Date of Patent: Dec. 22, 1998

[54] AUTOMATIC GUARD LIFTING SYSTEM

[76] Inventor: James E Welch, P.O. Box 881471, Steamboat Springs, Colo. 80488

[21] Appl. No.: 821,213

[22] Filed: Mar. 20, 1997

[51] Int. Cl.$^6$ .................................................. B23D 45/16

[52] U.S. Cl. ................................................ 30/391; 83/546

[58] Field of Search .................. 30/391, 388; 144/251.1; 83/478, 546

[56] References Cited

U.S. PATENT DOCUMENTS 3,410,325 11/1968 Winther .................................... 30/391

3,613,748 10/1971 DePue ...................................... 30/391

*Primary Examiner*—Douglas D. Watts

[57] ABSTRACT

A new Automatic Guard Lifting System for automatically elevating a lower guard on a conventional circular saw thereby preventing the lower guard from interfering during cutting of an object.

The inventive device includes a motor having a shaft secured to the circular saw, a sleeve having a slot secured within an upper guard, a cable connected to the shaft and the lower guard, and a limiting switch electrically connected to the motor.

4 Claims, 2 Drawing Sheets

FIG.1
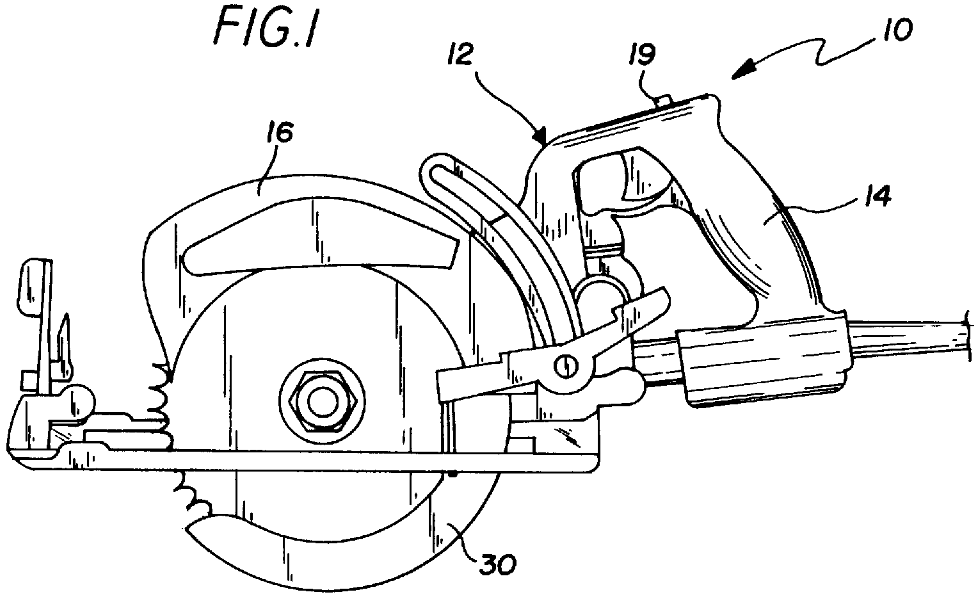
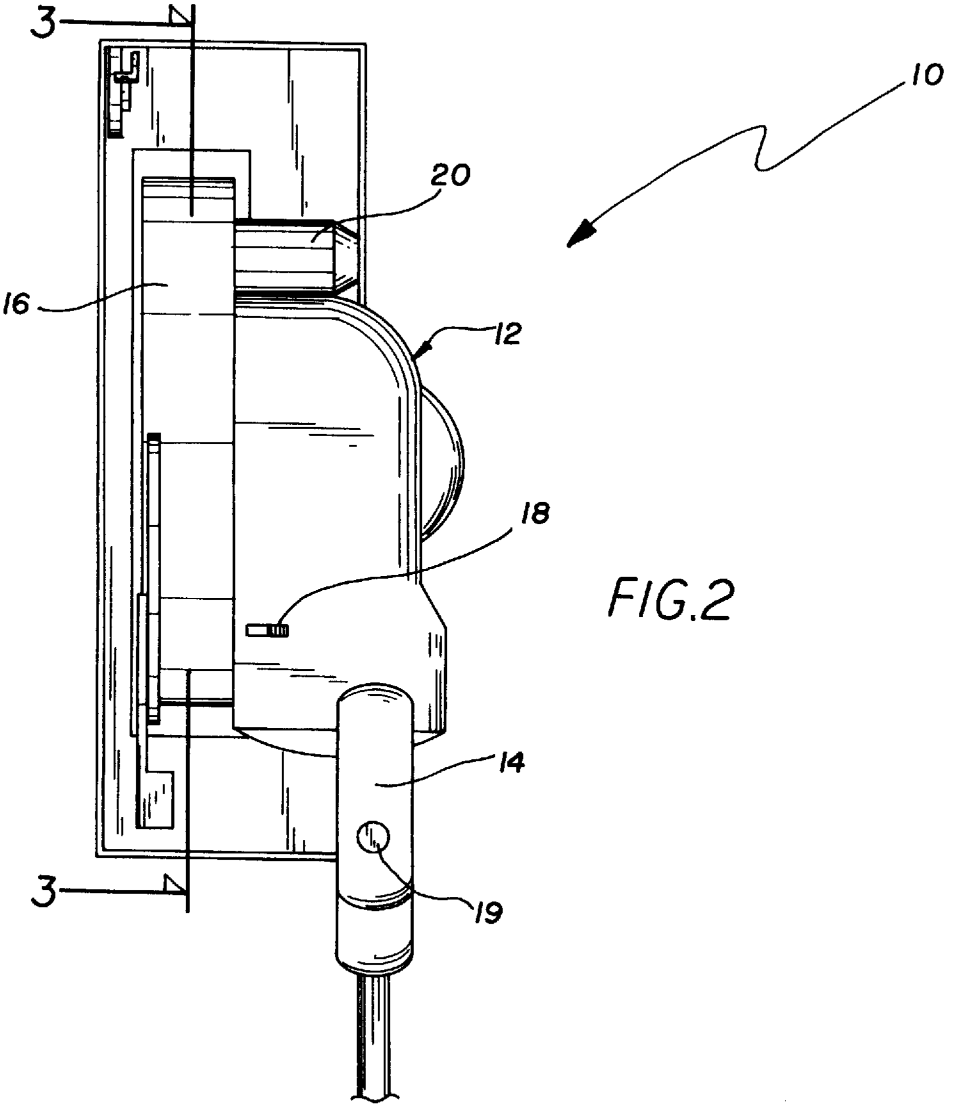
FIG.2

FIG. 3
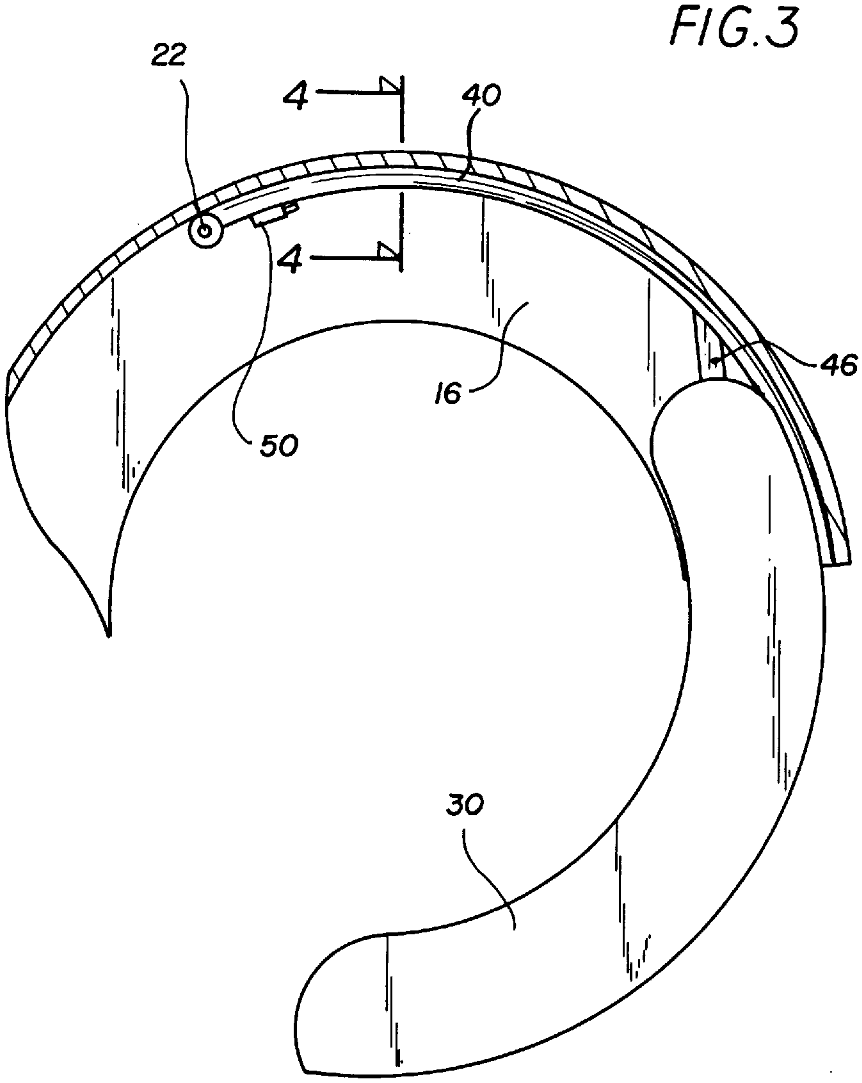
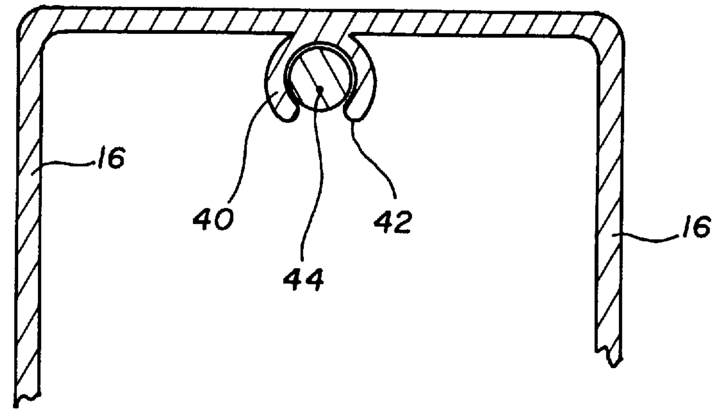
FIG. 4

AUTOMATIC GUARD LIFTING SYSTEM

BACKGROUND OF THE INVENTION

1. Field of the Invention

The present invention relates to Motorized Saw Guard Devices and more particularly pertains to a new Automatic Guard Lifting System for automatically elevating a lower guard on a conventional circular saw thereby preventing the lower guard from interfering during cutting of an object.

2. Description of the Prior Art

The use of Motorized Saw Guard Devices is known in the prior art. More specifically, Motorized Saw Guard Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Motorized Saw Guard Devices include U.S. Pat. No. 4,685,214; U.S. Pat. No. 5,370,025; U.S. Pat. No. 3,965,787; U.S. Pat. Design No. 337,500; U.S. Pat. No. 5,375,495; and U.S. Pat. No. 3,974,724.

While these devices fulfill their respective, particular objectives and requirements, the aforementioned patents do not disclose a new Automatic Guard Lifting System. The inventive device includes a motor having a shaft secured to the circular saw, a sleeve having a slot secured within an upper guard, a cable connected to the shaft and the lower guard, and a limiting switch electrically connected to the motor.

In these respects, the Automatic Guard Lifting System according to the present invention substantially departs from the conventional concepts and designs of the prior art, and in so doing provides an apparatus primarily developed for the purpose of automatically elevating a lower guard on a conventional circular saw thereby preventing the lower guard from interfering during cutting of an object.

SUMMARY OF THE INVENTION

In view of the foregoing disadvantages inherent in the known types of Motorized Saw Guard Devices now present in the prior art, the present invention provides a new Automatic Guard Lifting System construction wherein the same can be utilized for automatically elevating a lower guard on a conventional circular saw thereby preventing the lower guard from interfering during cutting of an object.

The general purpose of the present invention, which will be described subsequently in greater detail, is to provide a new Automatic Guard Lifting System apparatus and method which has many of the advantages of the Motorized Saw Guard Devices mentioned heretofore and many novel features that result in a new Automatic Guard Lifting System which is not anticipated, rendered obvious, suggested, or even implied by any of the prior art Motorized Saw Guard Devices, either alone or in any combination thereof.

To attain this, the present invention generally comprises a motor having a shaft secured to the circular saw, a sleeve having a slot secured within an upper guard, a cable connected to the shaft and the lower guard, and a limiting switch electrically connected to the motor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Automatic Guard Lifting System apparatus and method which has many of the advantages of the Motorized Saw Guard Devices mentioned heretofore and many novel features that result in a new Automatic Guard Lifting System which is not anticipated, rendered obvious, suggested, or even implied by any of the prior art Motorized Saw Guard Devices, either alone or in any combination thereof.

It is another object of the present invention to provide a new Automatic Guard Lifting System which may be easily and efficiently manufactured and marketed.

It is a further object of the present invention to provide a new Automatic Guard Lifting System which is of a durable and reliable construction.

An even further object of the present invention is to provide a new Automatic Guard Lifting System which is susceptible of a low cost of manufacture with regard to both materials and labor, and which accordingly is then susceptible of low prices of sale to the consuming public, thereby making such Automatic Guard Lifting System economically available to the buying public.

Still yet another object of the present invention is to provide a new Automatic Guard Lifting System which provides in the apparatuses and methods of the prior art some of the advantages thereof, while simultaneously overcoming some of the disadvantages normally associated therewith.

Still another object of the present invention is to provide a new Automatic Guard Lifting System for automatically elevating a lower guard on a conventional circular saw thereby preventing the lower guard from interfering during cutting of an object.

Yet another object of the present invention is to provide a new Automatic Guard Lifting System which includes a motor having a shaft secured to the circular saw, a sleeve having a slot secured within an upper guard, a cable connected to the shaft and the lower guard, and a limiting switch electrically connected to the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new Automatic Guard Lifting System according to the present invention.

FIG. 2 is a top view of the present invention.

FIG. 3 is a cross sectional view taken along line 3—3 of FIG. 2.

FIG. 4 is a cross sectional view taken along line 4—4 of FIG. 3.

DESCRIPTION OF THE PREFERRED EMBODIMENT

With reference now to the drawings, and in particular to FIGS. 1 through 4 thereof, a new Automatic Guard Lifting System embodying the principles and concepts of the present invention and generally designated by the reference numeral 10 will be described.

As best illustrated in FIGS. 1 through 4, the Automatic Guard Lifting System 10 comprises an elevating means secured to the circular saw 12 and mechanically connected to the lower guard 30, and the elevating means electrically connected to a power switch 18 and an activating switch 19 of the circular saw 12. The activating switch 19 is secured within a handle 14 of the circular saw 12. The elevating means elevates the lower guard 30 when both the power switch 18 and the activating switch 19 are closed. The elevating means descends the lower guard 30 when either the power switch 18 or the activating switch 19 are open.

As shown in FIGS. 1 through 4 of the drawings, the elevating means comprises a motor 20 secured the circular saw 12 adjacent an upper guard 16 of the circular saw 12. The motor 20 includes a shaft 22 projecting traversely into the upper guard 16 as shown in FIG. 3. A sleeve 40 has a first end and a second end and is secured within an interior portion of the upper guard 16. The sleeve 40 includes a slot 42 from the first end to the second end as shown in FIG. 4. A cable 44 is secured at one end to the shaft 22 of the motor 20 and slidably projects through the sleeve 40 and the cable 44 secured to an arm 46 opposite of the shaft 22. The arm 46 is pivotally connected to the lower guard 30 for elevating and descending the lower guard 30. As shown in FIG. 3 of the drawings, a limiting switch is secured within the upper guard 16 and is electrically connected to the motor 20 for turning off the motor 20 upon detecting the lower guard 30 juxtaposed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

I claim:

1. An automatic guard lifting system for automatically elevating a lower guard of a conventional circular saw, comprising:

an elevating means for elevating the lower guard of the circular saw, the elevating means secured to said circular saw and mechanically connected to said lower guard; and said elevating means electrically connected to a power switch and an activating switch of said circular saw, wherein said elevating means elevates said lower guard when both said power switch and said activating switch are closed, and wherein said elevating means descends said lower guard when either said power switch or said activating switch are open;

wherein said elevating means comprises:

a motor mounted adjacent to an upper guard of said circular saw, said motor including a shaft projecting through said upper guard;

a sleeve secured to an interior portion of said upper guard, said sleeve having a first end and a second end, said sleeve including a slot extending from said first end to said second end;

a cable having opposite ends, one of said ends of said cable being secured to said shaft of said motor, said cable being slidably received in said sleeve; and an arm pivotally connected to said lower guard, said arm being secured to the other of said ends of said cable for moving said lower guard between elevated and descended positions.

2. An automatic guard lifting system for automatically elevating a lower guard of a conventional circular saw, comprising:

an elevating means secured to said circular saw and mechanically connected to said lower guard; and said elevating means electrically connected to a power switch and an activating switch of said circular saw, wherein said elevating means elevates said lower guard when both said power switch and said activating switch are closed and wherein said elevating means descends said lower guard when either said power switch or said activating switch are open; and wherein said elevating means comprises:

a motor secured within the circular saw adjacent an upper guard of said circular saw;

said motor includes a shaft projecting transversely into said upper guard;

a sleeve having a first end and a second end secured within an interior portion of said upper guard;

said sleeve includes a slot from said first end to said second end;

a cable secured at one end to said shaft of said motor and projecting slidably through said sleeve and said cable secured to an arm opposite of said shaft; and said arm is pivotally connected to said lower guard for elevating and descending said lower guard.

3. The automatic guard lifting system of claim 2, including a limiting switch secured within said upper guard and electrically connected to said motor for turning off said motor upon detecting that said lower guard is in a position juxtaposed to said upper guard.

4. A circular saw having an electrically controlled retractable lower blade guard, the circular saw comprising:

a circular saw having an upper blade guard and a lower blade guard;

an elevating means secured to said circular saw and mechanically connected to said lower blade guard;

said elevating means being in a circuit with a power switch and an activating switch of said circular saw, said circuit being configured such that said elevating means elevates said lower guard when both said power switch and said activating switch are closed, and wherein said elevating means descends said lower guard when either said power switch or said activating switch are open;

wherein said elevating means includes a motor, said motor secured within a circular saw housing, said motor being adjacent an upper blade guard of said circular saw;

said motor including a shaft projecting transversely into said upper blade guard;

wherein said elevating means includes a sleeve having a first end and a second end secured within an interior portion of said upper blade guard;

said sleeve including a slot from said first end to said second end;

wherein said elevating means includes a cable secured at one cable end to said shaft of said motor, said cable projecting through said sleeve, a second cable end of said cable being secured to an arm opposite of said shaft; and said arm being pivotally connected to said lower guard for elevating and descending said lower guard.

* * * * *